US011904970B2

(12) United States Patent
Habu et al.

(10) Patent No.: US 11,904,970 B2
(45) Date of Patent: Feb. 20, 2024

(54) AIRBAG MODULE

(71) Applicants: Autoliv Development AB, Vargarda (SE); Masaru Habu, Kanagawa (JP); Sho Murakami, Kanagawa (JP)

(72) Inventors: Masaru Habu, Kanagawa (JP); Sho Murakami, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 26 days.

(21) Appl. No.: 17/757,269

(22) PCT Filed: Oct. 21, 2020

(86) PCT No.: PCT/JP2020/039570
§ 371 (c)(1),
(2) Date: Jun. 13, 2022

(87) PCT Pub. No.: WO2021/124674
PCT Pub. Date: Jun. 24, 2021

(65) Prior Publication Data
US 2023/0001998 A1 Jan. 5, 2023

(30) Foreign Application Priority Data
Dec. 18, 2019 (JP) ................................ 2019-228075

(51) Int. Cl.
*B62J 27/20* (2020.01)
(52) U.S. Cl.
CPC .................................... *B62J 27/20* (2020.02)
(58) Field of Classification Search
CPC . B60R 21/215; B60R 21/217; B60R 21/2176; B60R 2021/2175
See application file for complete search history.

(56) References Cited

U.S. PATENT DOCUMENTS

| 4,903,986 A | * | 2/1990 | Cok | B60R 21/2035 |
| | | | | 280/728.2 |
| 5,308,111 A | * | 5/1994 | Sommer | B60R 21/216 |
| | | | | 280/732 |

(Continued)

FOREIGN PATENT DOCUMENTS

| CN | 102216125 A | | 10/2011 | |
| CN | 102656056 A | * | 9/2012 | ........... B60R 21/217 |

(Continued)

OTHER PUBLICATIONS

Masaki et al., Air Bag Device, Sep. 5, 2012, EPO, CN 10 265 6056 A, Machine Translation of Description (Year: 2012).*

(Continued)

*Primary Examiner* — James A English
(74) *Attorney, Agent, or Firm* — DICKINSON WRIGHT PLLC (57) ABSTRACT

The configuration of an airbag module according to the present invention includes an airbag cushion, an inflator equipped in this airbag cushion, and housing for stowing this airbag cushion, wherein the housing has a convex polygonal shape in cross-section and has an opening on the upper side, and when the airbag cushion expands and deploys, a first pair of mutually opposed side surfaces expand separating from each other, the airbag module further comprises a cover covering the opening and side surfaces of the housing, and of the cover, the upper surface portion that covers the opening of the housing is formed with a first weak portion that extends in the longitudinal direction of the upper surface portion, is weaker than the area surrounding thereof, and is cleaved by the separation of the first pair of side surfaces.

9 Claims, 11 Drawing Sheets

(56) References Cited

U.S. PATENT DOCUMENTS

| | | | |
|---|---|---|---|
| 6,742,804 B2* | 6/2004 | Suzuki | B60R 21/2165 280/732 |
| 6,793,238 B2* | 9/2004 | Schneider | B60R 21/2165 280/728.2 |
| 7,104,566 B2 | 9/2006 | Pinsenschaum et al. | |
| 8,955,873 B2 | 2/2015 | Kazutaka | |
| 10,688,954 B2 | 6/2020 | Thomas et al. | |
| 11,447,089 B2* | 9/2022 | Deutschmann | B60R 21/2155 |
| 2003/0178818 A1* | 9/2003 | Schneider | B60R 21/2165 280/728.3 |
| 2004/0004343 A1 | 1/2004 | Pinsenschaum et al. | |
| 2010/0117337 A1* | 5/2010 | Yamauchi | B60R 21/217 280/728.2 |
| 2011/0309602 A1* | 12/2011 | Kuroe | B62J 27/20 280/728.3 |
| 2014/0015232 A1* | 1/2014 | Sugimoto | B60R 21/2165 280/728.3 |
| 2019/0161049 A1 | 5/2019 | Thomas et al. | |
| 2022/0340099 A1* | 10/2022 | Murakami | B60R 21/216 |
| 2022/0402454 A1* | 12/2022 | Murakami | B60R 21/217 |

FOREIGN PATENT DOCUMENTS

| | | | |
|---|---|---|---|
| CN | 105324277 A | | 2/2016 |
| CN | 208325072 U | | 1/2019 |
| CN | 109849833 A | | 6/2019 |
| CN | 114007907 A | * | 2/2022 ........... B60R 21/203 |
| DE | 102017120770 A1 | | 3/2019 |
| EP | 2345562 A1 | | 7/2011 |
| EP | 3006275 A1 | | 4/2016 |
| JP | 2000-142293 A | | 5/2000 |
| JP | 2000-153745 A | | 6/2000 |
| JP | 2001-10438 A | | 1/2001 |
| JP | 2007-203890 A | | 8/2007 |
| JP | 2007-203937 A | | 8/2007 |
| JP | 2009029167 A | | 2/2009 |
| JP | 2015-205584 A | | 11/2015 |

OTHER PUBLICATIONS

CN 202080079699.9 First Office Action dated Sep. 7, 2023, with English translation; 16 pages.

* cited by examiner

AIRBAG MODULE

TECHNICAL FIELD

The present invention relates to an airbag module provided with an airbag cushion and a case type housing for stowing the airbag cushion.

BACKGROUND ART

Airbag devices have generally become standard equipment in vehicles in recent years. An airbag device is a safety device which is operated in the event of an emergency such as a vehicle collision, retaining and protecting passengers utilizing an airbag cushion which expands and deploys based on gas pressure. Prior to expansion and deployment, the airbag cushion is folded or rolled into a small, stowed form for installation in various places in a vehicle.

For example, patent Document 1 discloses a knee protection airbag device including an airbag that is folded and stowed on a lower surface side of a column cover covering a steering column and an inflator that supplies inflation gas to the airbag. In the knee protection airbag device of Patent Document 1, an airbag into which the expansion gas discharged from the inflator flows protrudes from the stowed site on the lower surface side of the column cover, and expands and deploys so as to cover the lower surface side of the column cover. This enables protecting both knees of the driver.

PRIOR ART DOCUMENTS

Patent Documents

Patent Document 1: Japanese Unexamined Patent Application 2007-203937

SUMMARY OF THE INVENTION

Problem to be Solved by the Invention

In an emergency, an airbag needs to rapidly expand and deploy. However, if the housing does not readily open, the expansion and deployment of the airbag will be hindered, and expanding and deploying an airbag at the desired timing will be difficult. Therefore, there has been a demand for the development of technology enabling housing to open more readily.

In light of these issues, an object of the present invention is to provide an airbag module where the housing opens readily during expansion and deployment of the airbag.

Means to Solve the Problem

To resolve the problems described above, a typical configuration of an airbag module according to the present invention includes:
a folded or rolled airbag cushion,
an inflator equipped in this airbag cushion, and
housing for stowing this airbag cushion, wherein
the housing has a convex polygonal shape in cross-section and has an opening on the upper side, and when the airbag cushion expands and deploys, a first pair of mutually opposed side surfaces expand separating from each other, the airbag module further comprises a cover covering the opening and side surfaces of the housing, and
of the cover, the upper surface portion that covers the opening of the housing is formed with a first weak portion that extends in the longitudinal direction of the upper surface portion, is weaker than the area surrounding thereof, and is cleaved by the separation of the first pair of side surfaces.

With the configuration described above, the pair of side walls of the housing are separated by the expanding and deploying airbag cushion. As a result, the opening on the upper side of the housing opens up. Therefore, when the airbag cushion expands, the airbag cushion can be easily deployed to the outside through the opening of the housing. As the housing opens readily in this manner, the speed of airbag cushion deployment can be increased. As a result, the deployment behavior is stable and the occupant can be restrained more quickly, so that occupant injury value can be reduced. In addition, the housing opening readily improves resistance of internal pressure reduction of the cushion during airbag cushion deployment. Therefore, the amount of cushion base material is anticipated to be reduced and the housing plate thickness is anticipated to be reduced enabling potential cost reduction.

Here, if a cover is used to cover the opening of the housing, the pair of side walls of the housing will separate before the airbag cushion breaks the cover and expands and deploys to the outside, especially when the height of the housing is high. Therefore, only deformation of the housing occurs, and deployment of the airbag cushion may be delayed.

Therefore, in the configuration described above, the cover is provided with a first weak portion extending in the longitudinal direction of the upper surface portion of the housing. This causes the cover to cleave at the first weak portion as the airbag cushion expands and deploys. Therefore, the airbag cushion can efficiently be expanded and deployed to the outside from the first weak portion that has been cleaved. Therefore, the airbag cushion can be rapidly expanded and deployed.

The convex polygonal shape described above is preferably a quadrangular shape. The aforementioned effect can be obtained by this manner of configuration as well. The "convex polygon" is in plan view, a polygon surrounded by three or more straight lines or curved line segments, where the inside angle of all of the angles is smaller than two right angles. Further, the cross-sectional view is defined as a plane observed in a plane orthogonal to the vertical direction from above or below.

The portion of the cover that covers the mutually opposed second pair of side surfaces of the housing is formed with second weak portions respectively extending downward from both ends of the first weak portion that are weaker than the area surrounding thereof and cleave subsequent to cleaving of the first weak portion.

With the configuration described above, the second weak portion of the cover also cleaves during expansion and deployment of the airbag cushion. As a result, the opening of the cover when the airbag cushion expands and deploys can be opened wider. Therefore, the effects as described above can be enhanced.

The direction in cross-section view of the second pair of side surfaces extending in the longitudinal direction intersects with the direction in cross-section view of the first pair of side surfaces extending in the longitudinal direction.

The cover described above may include a third weak portion that extends along the boundary of the portion that covers the opening of the housing and the portion that covers the second pair of side surfaces of the housing, that is weaker than the surrounding area thereof, and is cleaved subsequent to the first weak portion cleaving. With this manner of configuration, the cover is cleaved in the first weak portion and the third weak portion. As a result, the opening of the cover can be further widened, and the airbag cushion can be expanded and deployed more quickly.

Effect of the Invention

The present invention enables providing an airbag module with the housing readily capable of opening when the airbag expands and deploys.

DESCRIPTION OF THE PREFERRED EMBODIMENTS

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention. In the drawings used in the following description, the upper and lower parts are referred to as "Up" and "Down".

Embodiment 1

Figure 1:
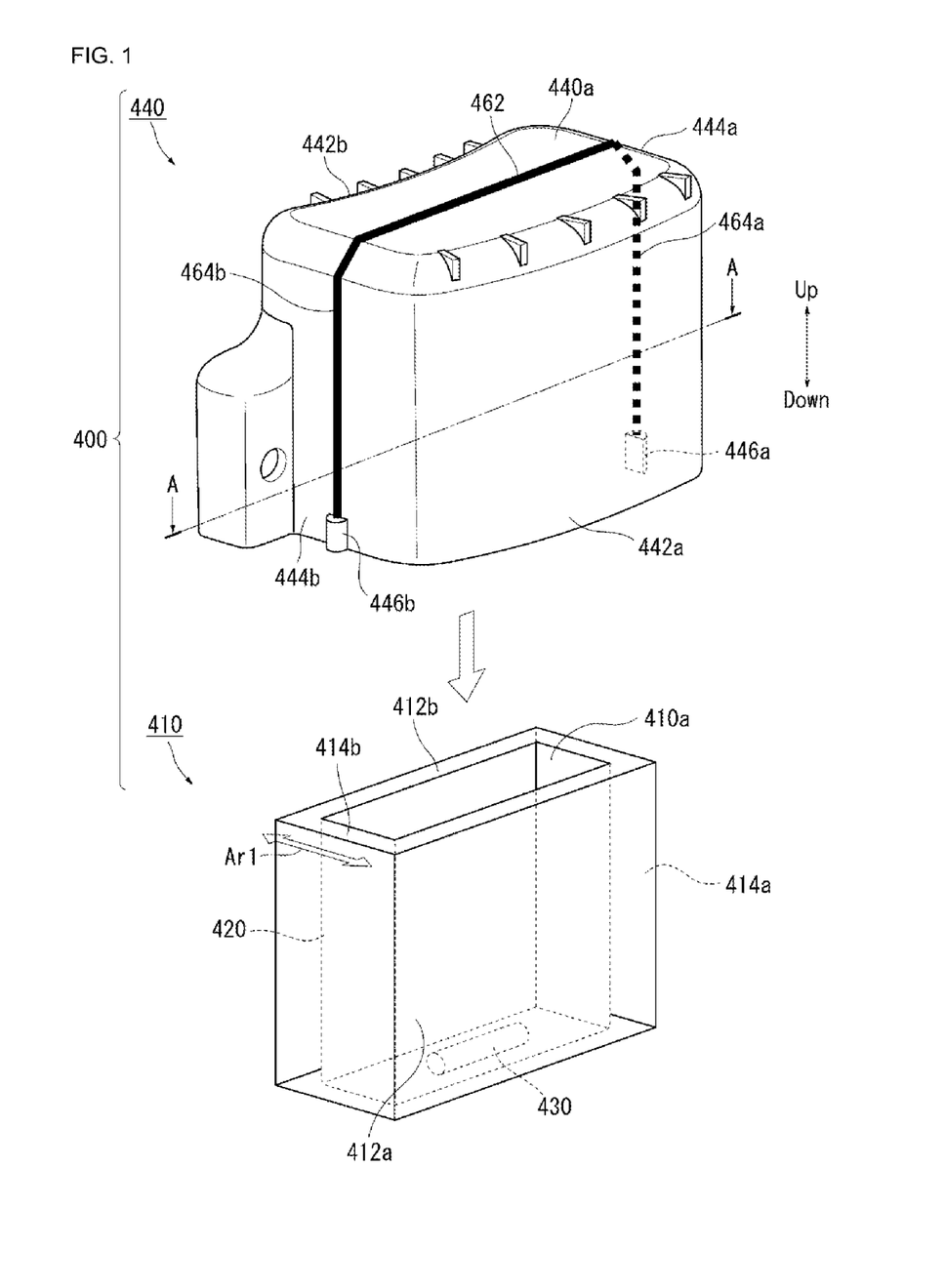
FIG. 1 is a perspective view of an airbag module according to Embodiment 1 of the present invention.

FIG. 1 is a perspective view of the airbag module 400 according to Embodiment 1 of the present invention. For ease of understanding, FIG. 1 schematically illustrates a housing 410, an airbag cushion 420, and an inflator 430 of the airbag module 400.

As illustrated in FIG. 1, the airbag module 400 includes the housing 410. The folded or wound airbag cushion 420 is stowed inside the housing 410. The inflator 430 is installed in the airbag cushion 420.

The cross-section of the housing 410 is a quadrangular shape and the upper part is an opening 410a. When the airbag cushion 420 expands and deploys, of the four side surfaces 412a, 412b, 414a, and 414b of the housing 410, the first pair of side surfaces 412a, 412b facing each other expand so as to be separated from each other in the Arl direction, deforming the housing 410. As a result, the opening 410a on the upper side of the housing 410 opens up. When the airbag cushion 420 expands, the airbag cushion 420 can be easily deployed to the outside through the opening 410a of the housing 410.

As the housing 410 opens readily in this manner, speed of deployment of the airbag cushion 420 can be increased. As a result, the deployment behavior is stable and the occupant can be restrained more quickly, so that occupant injury value can be reduced. In addition, the housing 410 opening readily provides an improvement in cushion resistance, reducing internal pressure during deployment of the airbag cushion 420. Therefore, the amount of cushion base material is anticipated to be reduced and the plate thickness of the housing 410 is anticipated to be reduced, enabling potential cost reduction.

Note that FIG. 1 illustrates the housing 410 having a quadrangular shape in cross-section view, but the present invention is not limited to this. Even if the housing 410 has a convex polygonal shape other than a quadrangular shape, the same effect as described above can be obtained.

And as illustrated in FIG. 1, the airbag module 400 of Embodiment 1 further includes a cover 440 that covers the opening 410a and the four side surfaces 412a, 412b, 414a, and 414b of the housing 410. The cover 440 has an upper surface portion 440a covering the opening 410a of the housing 410 and four opposing surfaces 442a, 442b, 444a, 444b that oppose the four side surfaces 412a, 412b, 414a, 414b of the housing 410.

As a feature of Embodiment 1, the cover 440 is formed with a first weak portion 462 and second weak portions 464a and 464b. The first weak portion 462 is formed in the upper surface portion 440a, which is a portion of the cover 440 that covers the opening 410a of the housing 410, and extends in the longitudinal direction of the upper surface portion 440a. The first weak portion 462 is weaker than the area surrounding thereof and is cleaved by the separation of the first pair of side surfaces 412a and 412b.

The second weak portions 464a and 464b are formed on the opposing surfaces 444a and 444b, which are the portions of the cover 440 that cover the mutually opposed second pair of side surfaces 414a and 414b of the housing 410, and continuously extend lower respectively from both ends of the first weak portion 462. The second weak portions 464a and 464b are weaker than the area surrounding thereof, and cleave following the cleavage of the first weak portion 462.

Providing the cover 440 with a first weak portion 462 as described above enables the cover 440 to cleave at the first weak portion 462 when the airbag cushion 420 expands and deploys. Therefore, the airbag cushion 420 can efficiently be expanded and deployed to the outside from the first weak portion 462 that has been cleaved. As a result, the airbag cushion 420 can be expanded and deployed more quickly and reliably than when a cover having no weak portion is used.

In addition, with the airbag module 400 of the present embodiment, the cover 440 is provided with the second weak portions 464a and 464b. Thus, the cover 440 also cleaves at the second weak portions 464a and 464b when the airbag cushion 420 expands and deploys. Therefore, the opening of the cover 440 when the airbag cushion 420 expands and deploys can be opened wider. Therefore, the airbag cushion 420 can be expanded and deployed to the outside more quickly and reliably. The direction in cross-section view of the second pair of side surfaces 414a and 414b extending in the longitudinal direction intersects with the direction in cross-section view of the first pair of side surfaces 412a and 412b extending in the longitudinal direction.

Figure 2:
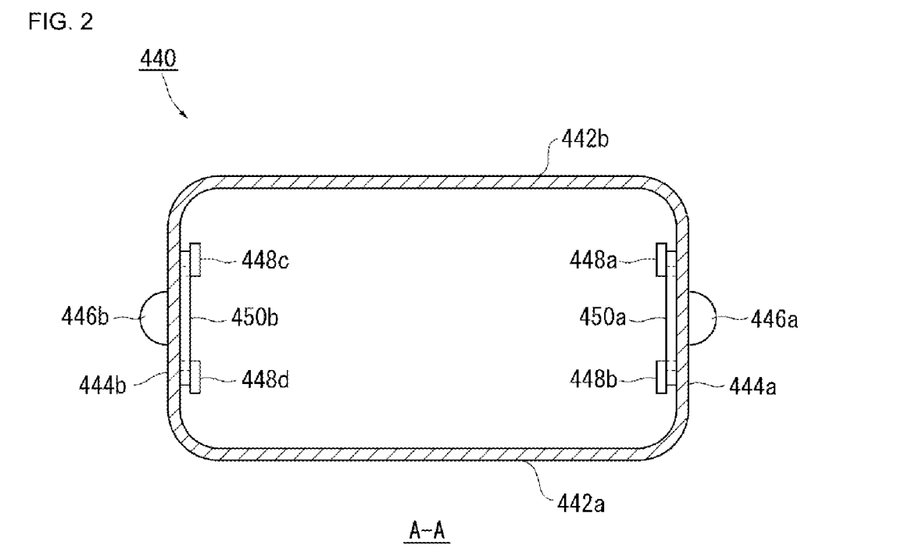
FIG. 2 is a schematic cross-sectional view taken along the line A-A of the cover of FIG. 1.

FIG. 2 is a schematic cross-sectional view taken along the line A-A of the cover 440 of FIG. 1. As illustrated in FIG. 2, rather than the first pair of side surfaces 412a and 412b that separate when the airbag cushion 420 expands and deploys, the cover 440 is provided with hinges 446a and 446b on the opposing surfaces 444a and 444b that are opposite the second pair of side surfaces 414a and 414b. Furthermore, straps 450a and 450b are engaged with hooks 448a and 448b and hooks 448c and 448d securing the hinges 446a and 446b to the opposing surfaces 444a and 444b.

With the configuration described above, even if the cover 440 is split into two due to cleavage of the first weak portion 462 and the second weak portions 464a and 464b, movement of the split cover 440 is restricted by the straps 450a and 450b. Therefore, scattering of the split cover 440 can be prevented.

Figure 3:
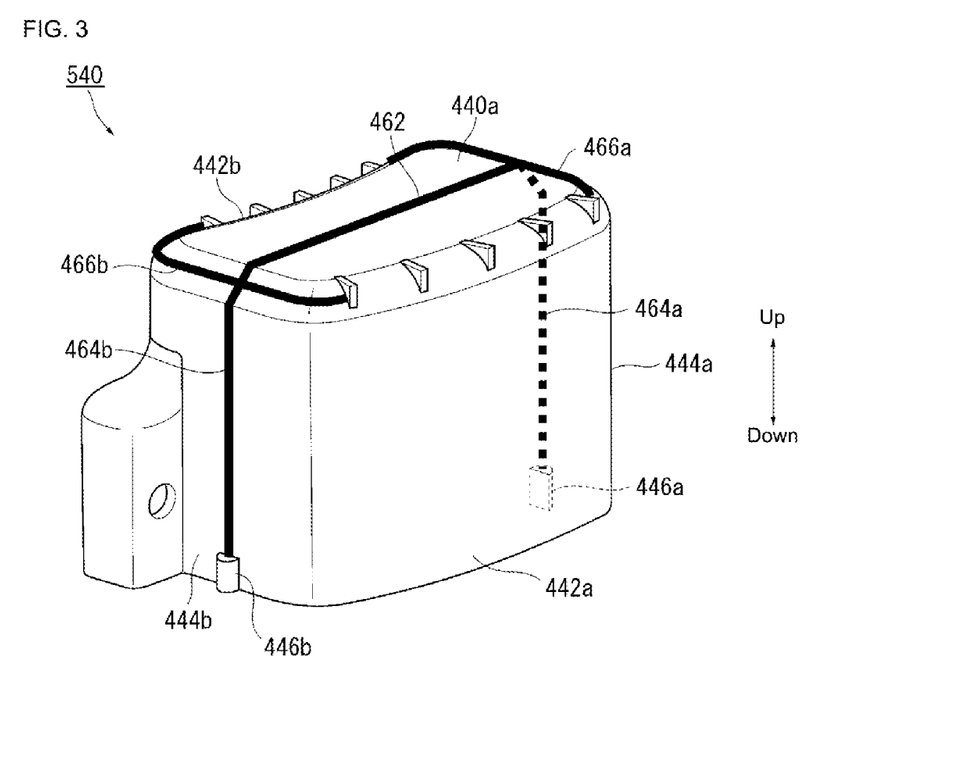
FIG. 3 is a diagram describing Embodiment 2 of the cover.

FIG. 3 is a diagram describing Embodiment 2 of the cover. With the cover 440 of Embodiment 1, the first weak portion 462 was formed on the upper surface portion 440a, and the second weak portions 464a and 464b were formed on the pair of opposing surfaces 444a and 444b. On the other hand, with the cover 540 illustrated in FIG. 3, third weak portions 466a and 466b are formed in addition to the first weak portion 462 and second weak portions 464a and 464b.

The third weak portions 466a and 466b are the portions that cover the opening 410a of the housing 410 (see FIG. 1) that extend along the boundaries of the upper surface portion 440a and the opposing surfaces 444a and 444b that are the portions that cover the second pair of side surfaces 414a and 414b of the housing 410 (see FIG. 1). The third weak portions 466a and 466b are weaker than the areas surrounding thereof and cleave subsequent to cleaving of the first weak portion 462.

With this manner of configuration, the cover 540 is cleaved at the third weak portions 466a and 466b in addition to the first weak portion 462 and the second weak portions 464a and 464b when the airbag cushion 420 expands and deploys. As a result, the opening of the cover 540 can be further widened, and the airbag cushion 420 can be expanded and deployed more quickly.

Figure 4:
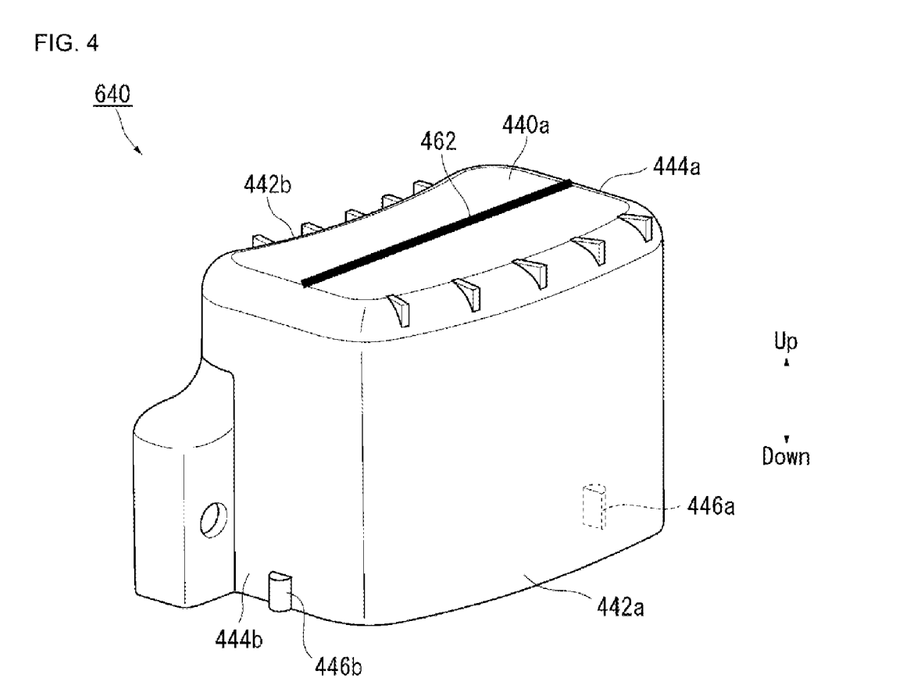
FIG. 4 is a diagram describing Embodiment 3 of the cover.

FIG. 4 is a diagram describing Embodiment 3 of the cover. With the cover 440 of Embodiment 1, the first weak portion 462 was formed on the upper surface portion 440a, and the second weak portions 464a and 464b were formed on the pair of opposing surfaces 444a and 444b. On the other hand, with a cover 640 illustrated in FIG. 4, only the first weak portion 462 is formed.

With the configuration described above, cleaving of the opposing surfaces 444a and 444b due to the second weak portions 464a and 464b does not occur but the upper surface portion 440a is cleaved by the first weak portion 462. Therefore, the effect of the airbag cushion 420 expanding and deploying externally from the first weak portion 462 cleavage location is achieved. Note, if a first weak portion 462 is formed as with the cover 640 illustrated in FIG. 4, the cover 640 having an upper surface portion 440a is sufficient and having opposing surfaces 442a, 442b, 444a, and 444b is not absolutely necessary.

Housing

Figure 5A:
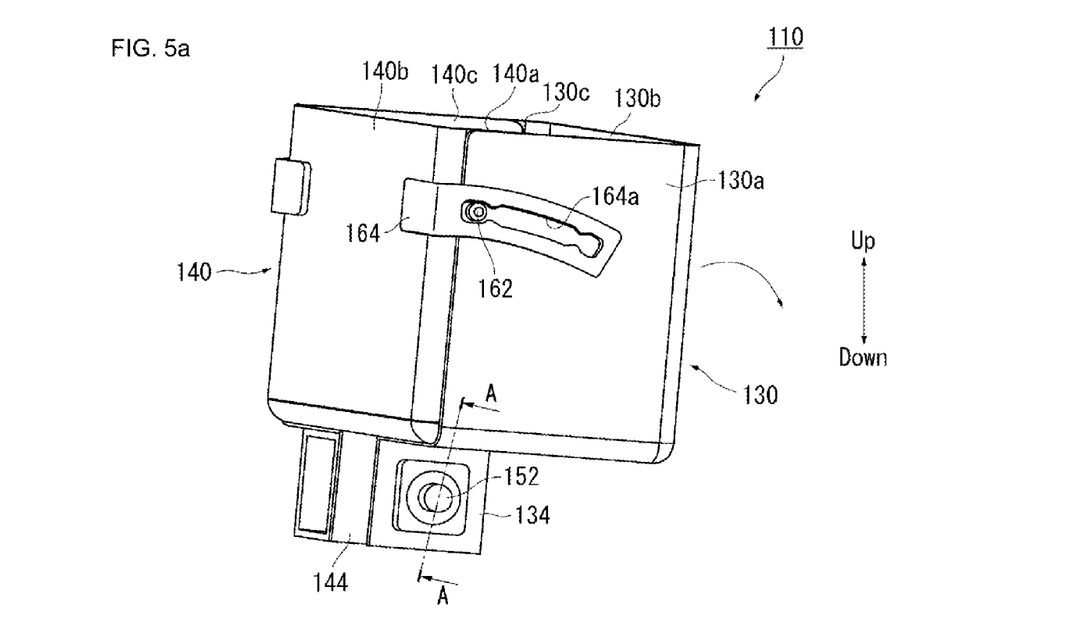
FIG. 5 is a perspective view describing a first housing structure.
Figure 5B:
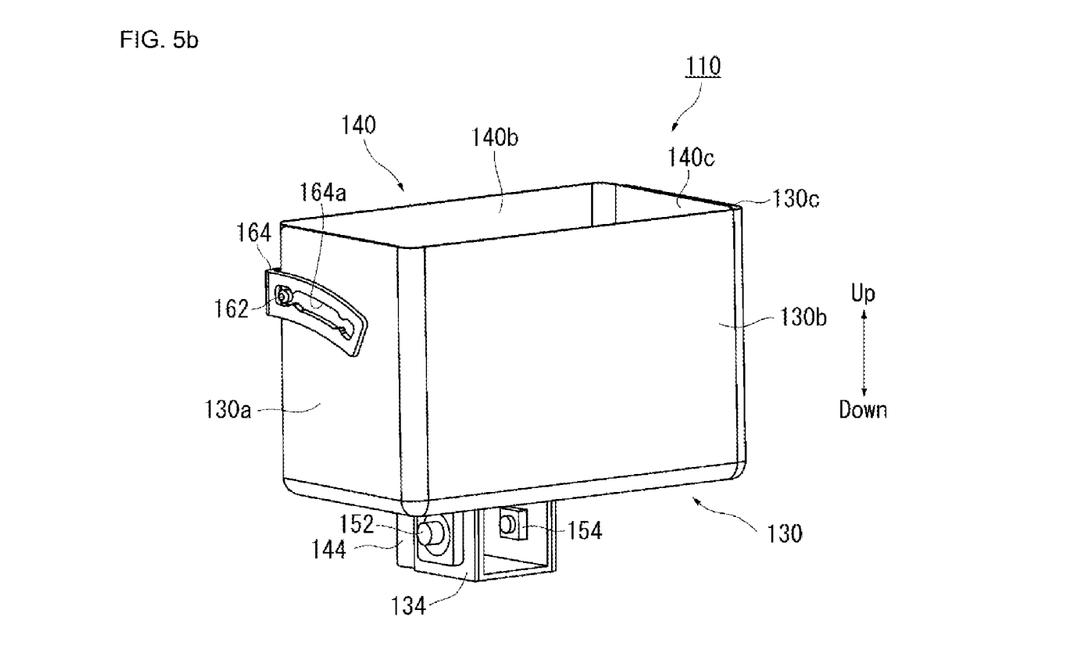
Figure 6:
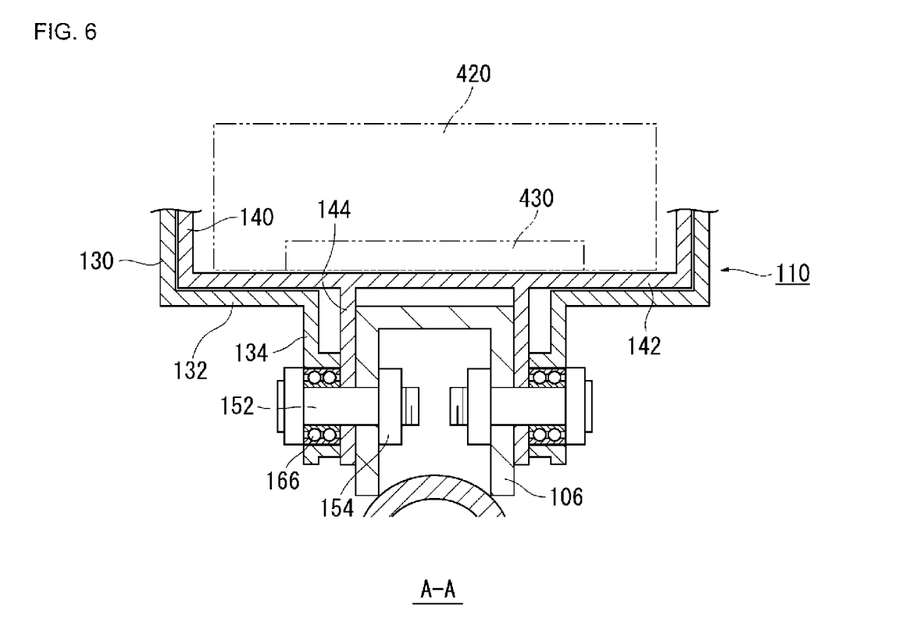
FIG. 6 is a schematic cross-sectional view of the leg part of FIG. 5(a) taken along the line A-A.

Next, a housing structure applicable to the housing 410 illustrated in FIG. 1 will be described. FIG. 5 is a perspective view illustrating a first housing structure 110. FIG. 5(a) is an overall perspective view of the first housing structure 110. FIG. 5(b) is a perspective view of the first housing structure 110 of FIG. 5(a) observed from a different direction. FIG. 6 is a schematic cross-sectional view of the leg part of FIG. 5(a) taken along the line A-A. For ease of understanding, FIG. 6 illustrates an airbag cushion 420 and an inflator 430 not shown in FIG. 5(a) as dashed lines.

As illustrated in FIG. 5(a) and FIG. 5(b), the first housing structure 110 is quadrangular and has a first member 130 and a second member 140. The first member 130 has three side walls 130a, 130b, and 130c. The second member 140 includes three side walls 140a, 140b, and 140c that are opposite the first member 130 and overlap inside the first member 130.

As illustrated in FIG. 6, leg parts 134 and 144 extend from bottom walls 132 and 142 of the first member 130 and the second member 140 respectively. The first housing structure 110 is secured with the leg parts 134 and 144 to the frame 106 by a bolt 152 and a nut 154. In the first housing structure 110, the bolt 152 connects the first member 130 and the second member 140, and serves as a rotation axis for relative rotation thereof.

As illustrated in FIG. 5, in Embodiment 1, the housing 110 is provided with a pin 162 and a bracket 164 as a member for guiding the rotation of the first member 130 and the second member 140. The pin 162 is secured to the first member 130. The bracket 164 is arc-shaped and is secured to the second member 140. An arc-shaped slot 164a in which the pin 162 is slidably inserted is formed in the bracket 164.

Figure 7A:
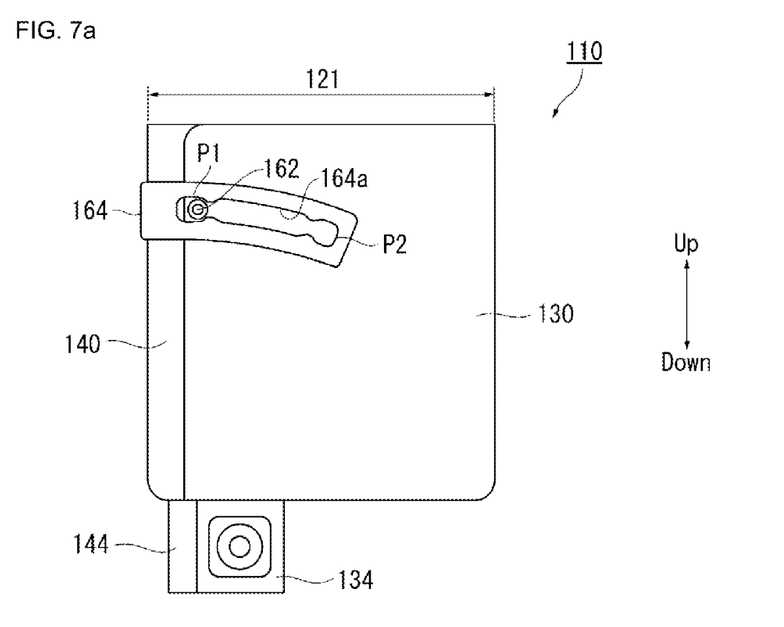
FIG. 7 is a diagram explaining the behavior of the first housing structure of FIG. 5 during expansion and deployment of the airbag cushion.
Figure 7B:
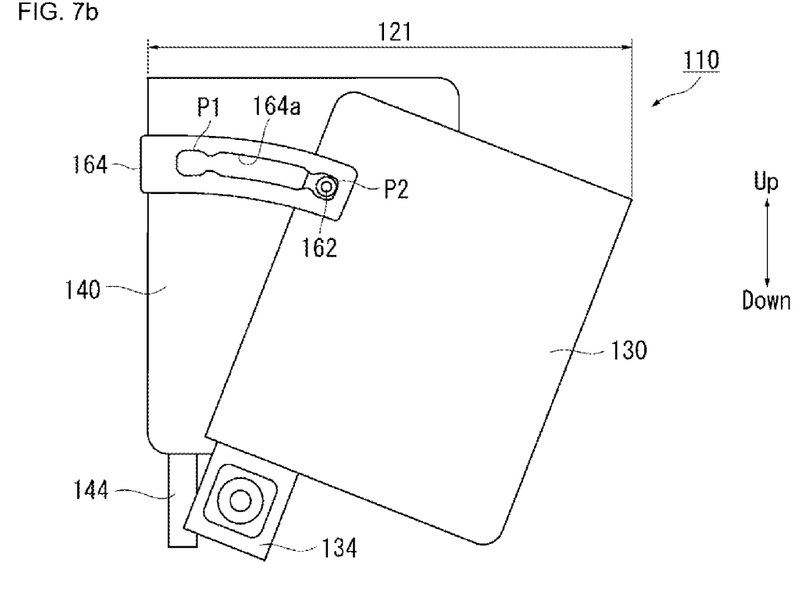

FIG. 7 is a diagram describing the behavior of the first housing structure 110 of FIG. 5 during expansion and deployment of the airbag cushion 420. Prior to expansion and deployment of the airbag cushion 420, the pin 162 is positioned at start point P1 of the bracket 164 slot 164a as illustrated in FIG. 7(a). Furthermore, when the airbag cushion 420 expands and deploys, the first member 130 is pushed out by the pressure thereof. Thus, the pin 162 moves in the slot 164a of the bracket 164 and the first member 130 rotates relative to the second member 140 around a rotational axis (bolt 152). Furthermore, as illustrated in FIG. 7(b), the pin 162 moves to the end point P2 of the slot 164a and the opening 121 of the upper side of the case type first housing structure 110 opens up.

With the configuration described above, rotation of the first member 130 with respect to the second member 140 causes the opening on the upper part of the first housing structure 110 to open up. In other words, the opening of the first housing structure 110 readily opens during expansion and deployment of the airbag cushion 420. As the first housing structure 110 opens readily in this manner, speed of the airbag cushion deployment can be increased.

Also, with the configuration described above, the pin 162 and the bracket 164 are provided to enable guiding the rotation of the first member 130 relative to the second member 140 in the first housing structure 110. Thus, stable operation is feasible and the desired behavior can be reliably obtained.

Furthermore, with the present embodiment, as illustrated in FIG. 6, the first housing structure 110 includes bearings 166 that are connected to the bolt 152 as a rotation axis.

Therefore, friction of the bolt 152 when the first member 130 rotates relative to the second member 140 can be reduced. Therefore, since the first member 130 and the second member 140 rotate more smoothly, the effects described above can be improved.

Figure 8:
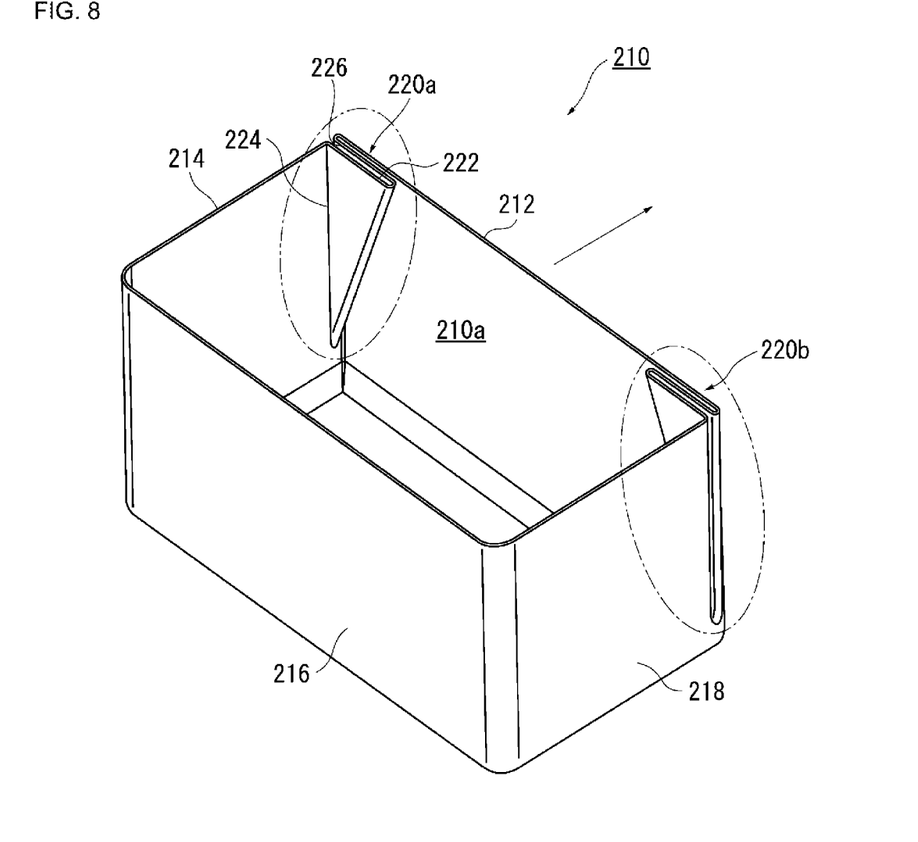
FIG. 8 is a perspective view explaining a second housing structure.

FIG. 8 is a perspective view describing a second housing structure 210. As illustrated in FIG. 8, the housing structure 210 includes four side walls, a side wall 212, side wall 214, side wall 216, and side wall 218, with the upper part thereof being an opening 210a, and two extendable walls 220a and 220b. The two extendable walls 220a and 220b connect one side wall 212 to two side walls 214 and 218 located on both sides thereof. As illustrated in FIG. 8, the two extendable walls 220a and 220b are in a folded state before the airbag cushion 420 (see FIG. 1) expands and deploys.

Figure 9:
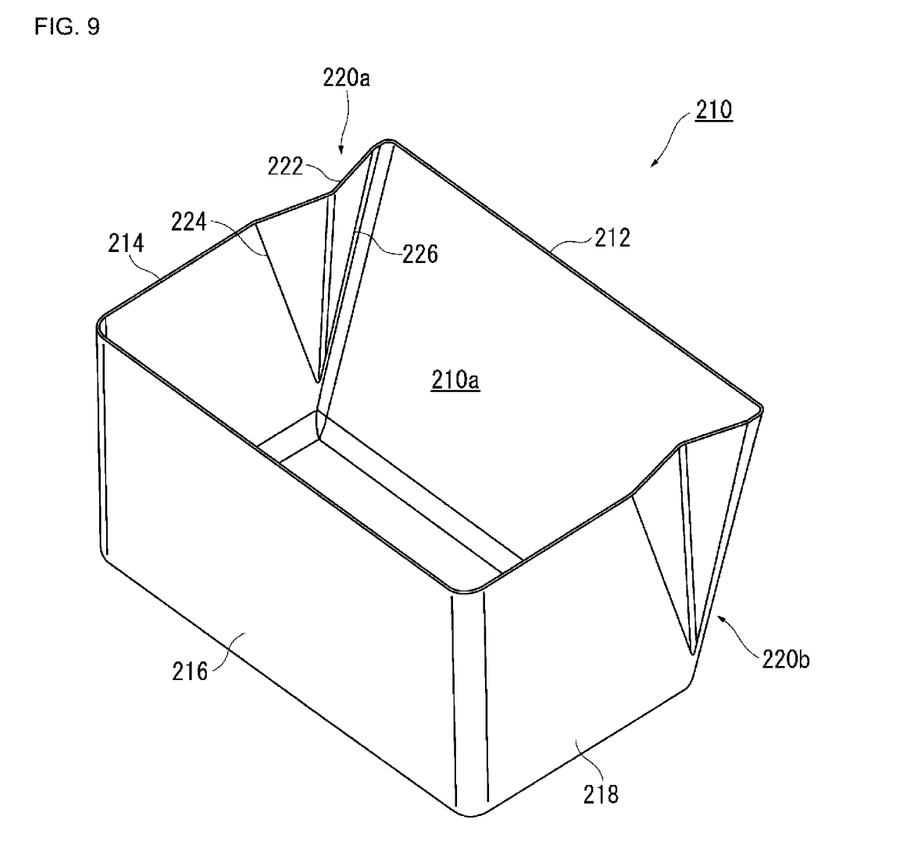
FIG. 9 is a perspective view illustrating a state in which the extendable walls of the housing structure of FIG. 8 open up.

FIG. 9 is a perspective view illustrating a state in which the extendable walls 220a and 220b of the housing structure 210 of FIG. 8 are opened up. As illustrated in FIG. 9, the two extendable walls 220a and 220b open up in this manner when the airbag cushion 420 (see FIG. 1) expands and deploys. Thus, the opening 210a of the upper part of the four side walls 212, 214, 216, and 218 opens up.

With the configuration described above, the opening 210a of the housing structure 210 more readily opens when the airbag cushion 420 expands and deploys. Thus, the deployment speed of the airbag cushion 420 can be increased, and deployment behavior is stabilized. Therefore, since the occupant can be restrained more quickly, the occupant injury value can be reduced.

In particular, with the second housing structure 210 illustrated in FIG. 9, the two extendable walls 220a and 220b have a triangular shape. Since the two extendable walls 220a and 220b have symmetrical shapes, the extendable wall 220a will be used as representative of the walls and will be described in detail below.

As illustrated in FIG. 9, the extendable wall 220a has a first side 226 along the edge of the side wall 212, a second side 224 along the edge of the side wall 214, and a third side 222 that connects the upper ends of the first side 226 and second side 224, composing a triangular shape.

In the configuration described above, the two extendable walls 220a and 220b have a triangular shape with a width that increases toward the top. As a result, when the two extendable walls 220a and 220b open up during the expansion and deployment of the airbag cushion 420, the opening 210a of the housing structure 210 widens toward the top. This enables further increase in the deployment speed of the airbag cushion 420.

Figure 10A:
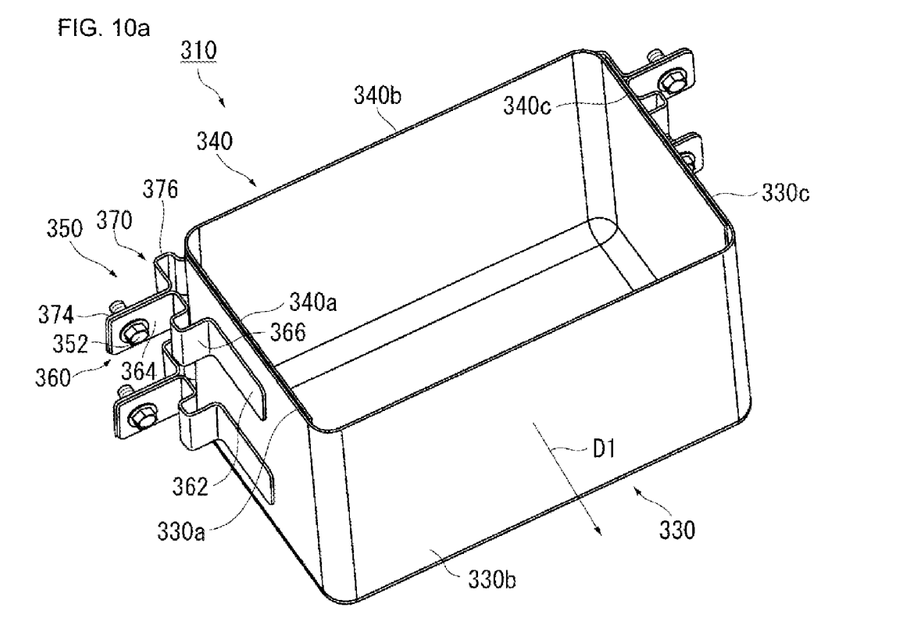
FIG. 10 is a perspective view describing a third housing structure.
Figure 10B:
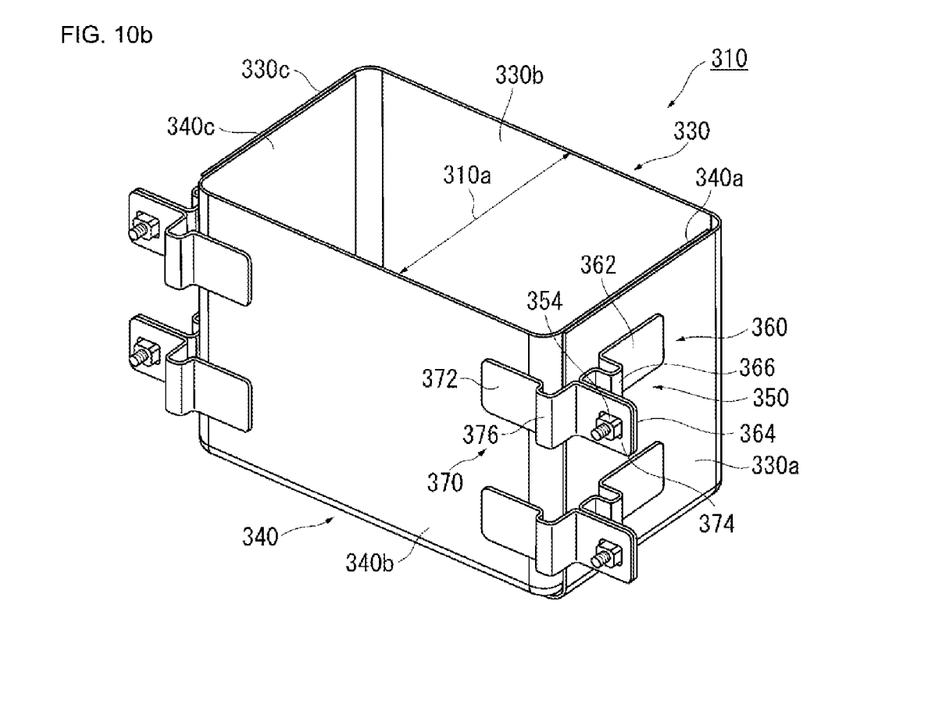
Figure 11:
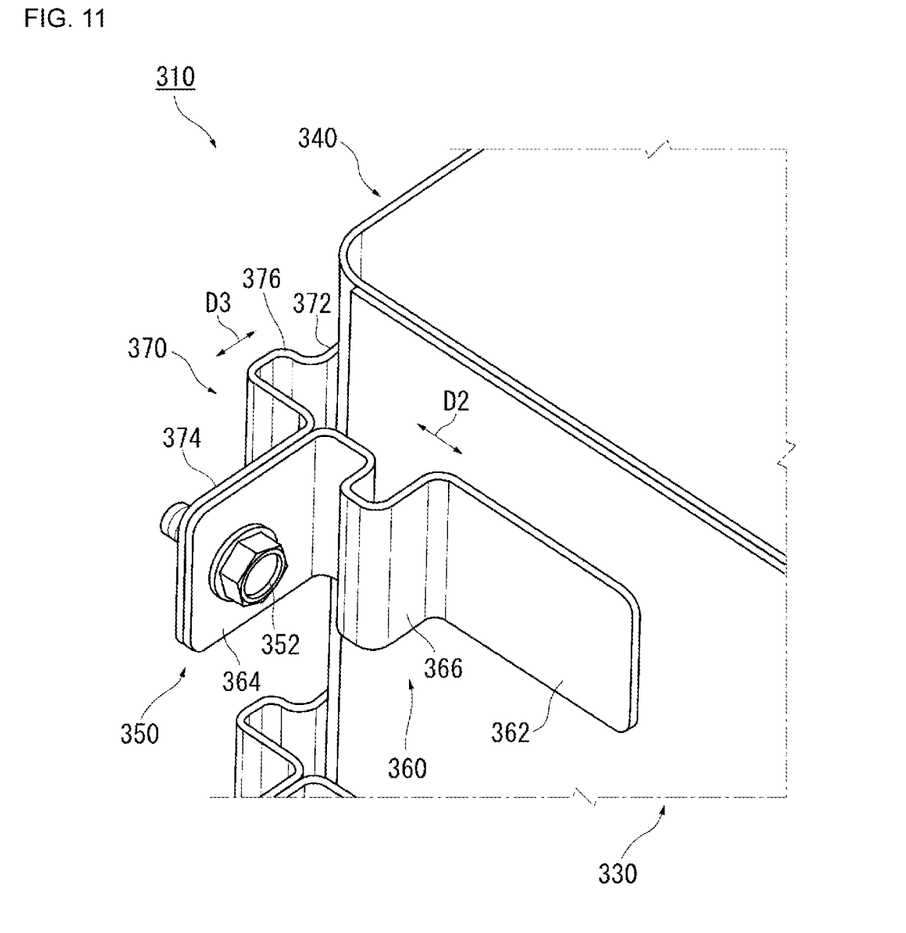
FIG. 11 is an expanded perspective view of the vicinity of the connecting member of FIG. 10(a).

FIG. 10 is a perspective view illustrating a third housing structure 310. FIG. 10(a) is an overall perspective view of the third housing structure 310. FIG. 10(b) is a perspective view of the third housing structure 310 of FIG. 10(a) observed from a different direction. FIG. 11 is an expanded perspective view of the vicinity of a connecting member 350 in FIG. 10(a).

As illustrated in FIG. 10(a) and FIG. 10(b), the third housing structure 310 includes a first member 330 and a second member 340. The first member 330 has three side walls 330a, 330b, and 330c. The second member 340 has three side walls 340a, 340b, and 340c, and is arranged inside the first member 330. The first member 330 and second member 340 are connected by the connecting member 350.

As illustrated in FIG. 10(b) and FIG. 11, the connecting member 350 includes a first connecting member 360 and a second connecting member 370. The first connecting member 360 includes a joint part 362, a connecting part 364, and a bending part 366. The joint part 362 is the location for joining with the first member 330 and the connecting part 364 is the location for connecting to the second connecting member 370. The bending part 366 that is a bending location is formed between the joint part 362 and the connecting part 364.

The second connecting member 370 includes a joint part 372, a connecting part 374, and a bending part 376. The joint part 372 is the location for joining with the second member 340 and the connecting part 374 is the location for connecting to the first connecting member 360. A bending part 376 that is the bending portion that is separated from the first member or the second member is formed between the joint part 372 and the connecting part 374.

The connecting portion 364 of the first connecting member 360 and connecting portion 374 of the second connecting member 370 are secured by a bolt 352 illustrated in FIG. 10(a) and a nut 354 illustrated in FIG. 10(b). Thus, the first member 330 and second member 340 are connected by means of the first connecting member 360 and second connecting member 370.

With the configuration described above, upon expansion and deployment of the airbag cushion 420 (see FIG. 1), the pressure thereof causes the bending parts 366 and 376 that are the bent portions of the connecting member 350 to extend in the directions of the arrows D2 and D3 illustrated in FIG. 11. Thus, the first member 330 separates from the second member 340 in the direction of the arrow D1 illustrated in FIG. 10(a) causing an opening 310a (see FIG. 10(b)) of the upper part of the third housing structure 310 to open.

Note, in the present embodiment, a configuration using two connecting members (first connecting member 360 and second connecting member 370) was illustrated but the configuration is not limited to this. For example, if the connecting part 364 of the first connecting member 360 is connected to the second member 340, the effect described above can be achieved without requiring the second connecting member 370.

Figure 12A:
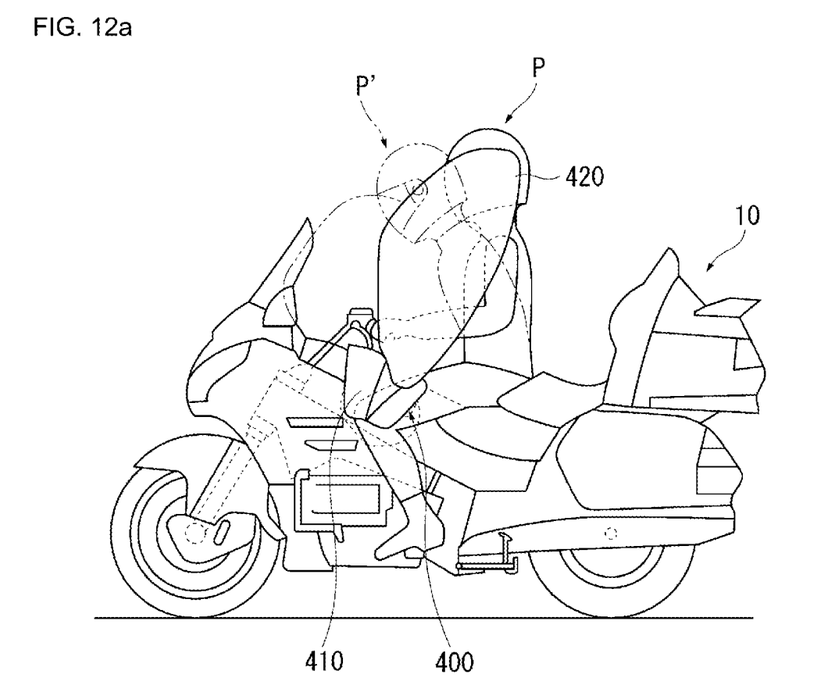
FIG. 12 is a diagram illustrating a vehicle equipped with the airbag module of the present embodiment.

FIG. 12 is a diagram illustrating a vehicle equipped with the airbag module of the present embodiment. FIG. 12(a) illustrates an example of a motorcycle 10 as a vehicle, and the airbag module 400 of Embodiment 1 as an airbag module mounted on the motorcycle 10. However, the vehicle is not limited to the motorcycle as a matter of course, and may be a four-wheeled vehicle, and the airbag module to be mounted may also use the airbag module of another embodiment.

As illustrated in FIG. 12(a), the airbag module 400 is mounted on the front portion of the motorcycle 10, that is, in front of the occupant P. The folded or rolled airbag cushion 420 and equipped inflator 430 are stowed inside the housing 410 of the airbag module 400 (see FIG. 1).

Figure 12B:
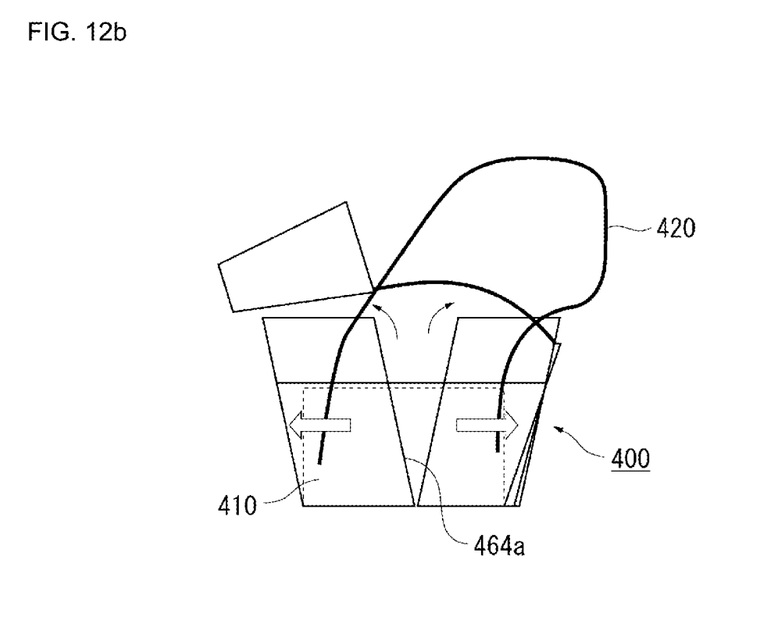

FIG. 12(b) is a schematic diagram illustrating the behavior of the airbag module 400 of FIG. 12(a) during expansion and deployment. When the motorcycle 10 is traveling, the occupant P is in a forward leaning posture as illustrated in the position P'. In an emergency, as illustrated in FIG. 12(b), the housing 410 is cleaved at the first weak portion 462 and the second weak portions 464a and 464b (see FIG. 1). As a result, the airbag cushion 420 expands and deploys to the outside of the housing 410, and as illustrated in FIG. 12(a), the occupant P can therefore be restrained and protected.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used as an airbag module provided with an airbag cushion and a case type housing for stowing the airbag cushion.

DESCRIPTION OF CODES

10. Motorcycle, 106. Frame, 110. First housing structure, 121. Opening, 130. First member, 130a. Side wall, 130b. Side wall, 130c. Side wall, 132. Bottom wall, 134. Leg part, 140. Second member, 140a. Side wall, 140b. Side wall, 140c. Side wall, 142. Bottom wall, 144. Leg part, 152. Bolt, 154. Nut, 162. Pin, 164. Bracket, 164a. Slot, 166. Bearing, 210. Second housing structure, 210a. Opening, 212. Side wall, 214. Side wall, 216. Side wall, 218. Side wall, 220a. Extendable wall, 220b. Extendable wall, 222. Third side, 224. Second side, 226. First side, 310. Third housing structure, 310a. Opening, 330. First member, 330a. Side wall, 330b. Side wall, 330c. Side wall, 340. Second member, 340a. Side wall, 340b. Side wall, 340c. Side wall, 350. Connecting member, 352. Bolt, 354. Nut, 360. First connecting member, 362. Joint part, 364. Connecting part, 366. Bending part, 370. Second connecting member, 372. Joint part, 374. Connecting part, 376. Bending part, 400. Airbag module, 410. Housing, 410a. Opening, 412a. Side surface, 412b. Side surface, 414a. Side surface, 414b. Side surface, 420. Airbag cushion, 430. Inflator, 440. Cover, 440a. Upper surface portion, 442a. Opposing surface, 442b. Opposing surface, 444a. Opposing surface, 444b. Opposing surface, 446a. Hinge, 446b. Hinge, 448a. Hook, 448b. Hook, 448c. Hook, 448d. Hook, 450a. Strap, 450b. Strap, 462. First weak portion, 464a. Second weak portion, 464b. Second weak portion, 466a. Third weak portion, 466b. Third weak portion, 540. Cover, 640. Cover.

The invention claimed is:

1. An airbag module, comprising:
a folded or rolled airbag cushion,
an inflator equipped in the airbag cushion, and
housing for stowing the airbag cushion, wherein
the housing has a convex polygonal shape in cross section and has an opening on the upper side, and when the airbag cushion expands and deploys, a first pair of mutually opposed side surfaces are separated from each other,
the airbag module further comprises a cover covering the opening and side surfaces of the housing,
the cover includes an upper surface portion that covers the opening of the housing and is formed with a first weak portion that extends in the longitudinal direction of the upper surface portion, is weaker than a surrounding area thereof, and is cleaved by a separation of the first pair of side surfaces,
the cover further includes a portion that covers a second pair of mutually opposed side surfaces of the housing and is formed with second weak portions that respectively extend continuously from a lower part of both ends of the first weak portion, are weaker than a surrounding areas thereof, and cleave subsequent to cleaving of the first weak portion, and
the housing and the cover are each opened rotationally with respect to the longitudinal axis to deploy the airbag cushion.

2. The airbag module according to claim 1, wherein the convex polygonal shape is a quadrangular shape.

3. The airbag module according to claim 1, wherein the direction in cross-section view of the second pair of side surfaces extending in the longitudinal direction intersects with the direction in cross-section view of the first pair of side surfaces extending in the longitudinal direction.

4. The airbag module according to claim 2, wherein the direction in cross-section view of the second pair of side surfaces extending in the longitudinal direction intersects with the direction in cross-section view of the first pair of side surfaces extending in the longitudinal direction.

5. The airbag module according to claim 1, wherein the cover includes a third weak portion that extends along the boundary of the portion that covers the opening of the housing and the portion that covers the second pair of side surfaces of the housing, is weaker than the surrounding area thereof, and cleaves subsequent to cleaving of the first weak portion.

6. The airbag module according to claim 2, wherein the cover includes a third weak portion that extends along the boundary of the portion that covers the opening of the housing and the portion that covers the second pair of side surfaces of the housing, is weaker than the surrounding area thereof, and cleaves subsequent to cleaving of the first weak portion.

7. The airbag module according to claim 3, wherein the cover includes a third weak portion that extends along the boundary of the portion that covers the opening of the housing and the portion that covers the second pair of side surfaces of the housing, is weaker than the surrounding area thereof, and cleaves subsequent to cleaving of the first weak portion.

8. The airbag module according to claim 4, wherein the cover includes a third weak portion that extends along the boundary of the portion that covers the opening of the housing and the portion that covers the second pair of side surfaces of the housing, is weaker than the surrounding area thereof, and cleaves subsequent to cleaving of the first weak portion.

9. The airbag module according to claim 1, wherein the cover includes at least one strap attached on each of opposing surfaces and configured to limit an angular movement of the cover when the airbag cushion expands and deploys.

* * * * *